(12) United States Patent
Sevindik (10) Patent No.: US 9,967,881 B1
(45) Date of Patent: May 8, 2018

(54) MANAGEMENT OF DATA TRANSMISSION OVER RADIO-LINK ENCOMPASSING MULTIPLE COMPONENT CARRIERS (71) Applicant: Sprint Spectrum L.P., Overland Park, KS (US)

(72) Inventor: Volkan Sevindik, Fairfax, VA (US)

(73) Assignee: Sprint Spectrum L.P., Overland Park, KS (US)

(*) Notice: Subject to any disclaimer, the term of this patent is extended or adjusted under 35 U.S.C. 154(b) by 419 days.

(21) Appl. No.: 14/575,428

(22) Filed: Dec. 18, 2014

(51) Int. Cl.
*H04W 72/00* (2009.01)
*H04W 72/04* (2009.01)

(52) U.S. Cl.
CPC .............................. *H04W 72/0453* (2013.01)

(58) Field of Classification Search
CPC  H04L 5/0098; H04W 72/005; H04W 72/048; H04W 72/0453
USPC .......................................... 370/30–350, 433
See application file for complete search history.

(56) References Cited

U.S. PATENT DOCUMENTS

| 5,583,869 | A | 12/1996 | Grube et al. |
| 6,721,569 | B1 | 4/2004 | Hashem et al. |
| 9,107,200 | B1 | 8/2015 | Naim et al. |
| 2006/0221939 | A1 | 10/2006 | Rosen et al. |
| 2006/0233188 | A1 | 10/2006 | Oliver et al. |
| 2007/0105576 | A1 | 5/2007 | Gupta et al. |
| 2007/0266157 | A1 | 11/2007 | Xhafa et al. |
| 2008/0013480 | A1 | 1/2008 | Kapoor et al. |
| 2008/0026696 | A1 | 1/2008 | Choi et al. |
| 2008/0254833 | A1 | 10/2008 | Keevill et al. |
| 2009/0057500 | A1 | 2/2009 | Bush et al. |
| 2010/0009328 | A1 | 4/2010 | Khanka et al. |
| 2010/0309930 | A1 | 12/2010 | Harrison et al. |
| 2012/0252477 | A1 | 10/2012 | Rao |
| 2012/0282942 | A1 | 11/2012 | Uusitalo et al. |
| 2013/0010711 | A1 | 1/2013 | Larsson et al. |
| 2013/0039302 | A1* | 2/2013 | Miki ...................... H04L 5/001 370/329 |

(Continued)

FOREIGN PATENT DOCUMENTS

EP     2 385 653 A2     9/2011

OTHER PUBLICATIONS

First Action Interview Pilot Program Pre-Interview Communication from U.S. Appl. No. 14/575,455, dated Sep. 9, 2016.

(Continued)

*Primary Examiner* — Rasheed Gidado (57) ABSTRACT

Disclosed is a method and system to facilitate management of resources in a scenario where a base station has an established radio-link-layer connection for serving a device on multiple component carriers. Rather than providing all bearer data transmission to the device by rote on the multiple component carriers, the base station dynamically decides per data whether to transmit the data to the device on the multiple component carriers or rather on just one of the component carriers. For instance, when the base station receives data for transmission over the radio-link-layer connection to the device, the base station determines based on at least one characteristic of the data whether to transmit the data to the UE on the multiple component carriers or rather on just one of the component carriers, and the base station then schedules and engages in the transmission in accordance with that determination.

17 Claims, 5 Drawing Sheets (56) References Cited

U.S. PATENT DOCUMENTS

| | | | |
|---|---|---|---|
| 2013/0083661 A1* | 4/2013 | Gupta | H04W 28/0215 370/235 |
| 2013/0109372 A1 | 5/2013 | Ekici | |
| 2014/0170990 A1 | 6/2014 | Black et al. | |
| 2015/0063151 A1* | 3/2015 | Sadek | H04W 24/08 370/252 |
| 2015/0135241 A1* | 5/2015 | Stoller | H04N 21/4755 725/92 |
| 2015/0305011 A1* | 10/2015 | Bergstrom | H04W 72/0453 370/329 |

OTHER PUBLICATIONS

U.S. Appl. No. 14/575,455, filed Dec. 18, 2014.
"Carrier Aggregation—Activation and Deactivation of Secondary Calls," How LTE Stuff Works, printed from the World Wide Web, dated Oct. 17, 2014.
First Action Interview Office Action from U.S. Appl. No. 14/575,455, dated Dec. 15, 2016.
U.S. Appl. No. 14/507,128, filed Oct. 6, 2014.
U.S. Appl. No. 14/871,208, filed Sep. 30, 2015.
First Action Interview Pilot Program Pre-Interview Communication from U.S. Appl. No. 14/871,208, dated May 19, 2017.
First Action Interview Office Action from U.S. Appl. No. 14/871,208, dated Aug. 21, 2017.
Office Action from U.S. Appl. No. 14/871,208, dated Nov. 16, 2017.

\* cited by examiner

MANAGEMENT OF DATA TRANSMISSION OVER RADIO-LINK ENCOMPASSING MULTIPLE COMPONENT CARRIERS

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective downlink frequency range or "downlink channel" for carrying communications from the base station to UEs and a respective uplink frequency range or "uplink channel" for carrying communications from UEs to the base station. Further, both the downlink channel and uplink channel of each carrier may be divided into sub-channels for carrying particular communications, such as one or more control channels for carrying control signaling and one or more traffic channels for carrying application-layer data and other traffic.

In general, when a UE is positioned within coverage of a base station, the base station may serve the UE on a particular carrier and may allocate resources on that carrier for use to carry communications over the air to and from the UE.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are divided over the bandwidth of the carrier into sub-carriers that are grouped within each slot into resource blocks. When a UE is positioned within coverage of a base station in such a system, the UE may register or "attach" with the base station, and the base station may then schedule particular downlink and uplink resource blocks on the air interface to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In practice in such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. The UE may then encode and transmit the data to the base station in the assigned resource blocks in that sub-frame.

With such an arrangement, the bandwidth of the carrier on which the base station serves a UE may define an effective limit on the rate of data communication between the base station and the UE, as the bandwidth would define only a limited number of resource blocks per slot, with data rate per resource block being further limited based on air interface conditions. By way of example, in accordance with the LTE standard, the uplink and downlink channels on each carrier may be 3 MHz, 5 MHz, 10 MHz, 15 MHz, or 20 MHz, each resource block spans 180 kHz, and each slot is 0.5 milliseconds long. Accounting for guard bands at the edges of each carrier, the maximum number of resource blocks per 0.5 millisecond slot is thus 15 in 3 MHz, 25 in 5 MHz, 50 in 10 MHz, 75 in 15 MHz, and 100 in 20 MHz. Consequently, an LTE base station that serves UEs on such a carrier would have only the specified number of resource blocks available to allocate for air interface communication per slot, with coding rate in each resource block being further limited based on air interface conditions.

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater number of resource blocks in which the base station can schedule uplink and downlink communication. Further, where the concurrently-used component carriers are sufficiently distant from each other in the frequency spectrum, serving a UE concurrently on those component carriers may additionally create a frequency-diversity effect that could further improve data throughput.

To provide a UE with carrier aggregation service, a base station may engage in signaling with the UE to establish a radio-link-layer connection that encompasses multiple component carriers, and the base station may then schedule data communication to/from the UE concurrently on those multiple component carriers.

For instance, in an LTE system, a base station may engage in Radio Resource Control (RRC) signaling with the UE, transmitting to the UE an RRC configuration message that specifies the multiple component carriers on which the base station will serve the UE, so that the UE will then prepare itself (e.g., tune itself) to communicate on those carriers. When the base station has data to transmit to the UE in a given sub-frame, the base station may then assign downlink resource blocks including one or more resource blocks respectively in each of the multiple component carriers, and the base station may (i) transmit to the UE in the sub-frame a DCI message that designates the assigned resource blocks in the multiple component carriers and (ii) transmit the data to the UE in those assigned resource blocks. Likewise, when the UE has data to transmit to the base station, the base station may assign uplink resource blocks including one or more resource blocks respectively in each of the multiple component carriers, and the base station may (i) transmit to the UE a DCI message that designates the assigned resource blocks in the multiple component carriers and (ii) receive the data communication from the UE in the assigned resource blocks.

OVERVIEW

Although serving a UE on multiple carriers concurrently can help improve throughput for the UE, doing so also necessarily makes use of more radio frequency spectrum than serving the UE on just one of the carriers at a time. In practice, the operator of a wireless communication system may have only a limited extent of radio frequency spectrum, such as a limited number of licensed carriers, available for use to serve UEs in a given market. Providing UEs with carrier aggregation service in such a system may thus consume more of that limited radio frequency spectrum than providing UEs with service on just one carrier at a time and may thereby leave less spectrum available to serve other UEs. Consequently, the decision of whether or not to provide UEs with carrier aggregation service may involve a cost-benefit analysis.

In addition, when a base station serves a UE, the base station may transmit to the UE various types of data, such as data representing various types of media or other data content. For example, as the base station is receiving and transmitting to the UE streaming media program-content such as a movie or television show, the base station may also from time to time receive and transmit to the UE various streaming media advertising-content (e.g., commercials that promote products or services). Further, or as a more specific example, the base station may receive and transmit to the UE various media or other data from one content provider and may also receive and transmit to the UE various media or other data content from another content provider.

In general, some of these data transmissions may be of greater value than others. For instance, the operator of the wireless communication system may make more money for transmitting non-advertising content (e.g., movies or television shows) to a UE than transmitting advertising content (e.g., commercials) to a UE. Given this, it may be desirable for the operator to use more of its radio frequency spectrum for certain data transmissions than for others, even in a situation where the various data transmissions are all of the same type, such as all streaming media or all best-efforts traffic for instance. For instance, it may be desirable for the operator to use more of its radio frequency spectrum to transmit non-advertising content and less of its radio frequency spectrum to transmit advertising content.

Disclosed herein is a method and system to facilitate such management of resources in a scenario where a base station has an established radio-link-layer connection for serving a UE on multiple component carriers. In such an arrangement, rather than providing all bearer data transmission to the UE by rote on the multiple component carriers, the base station can be configured to dynamically decide per data whether to transmit the data to the UE on the multiple component carriers or rather on just one of the component carriers. In particular, when the base station receives data for transmission over the radio-link-layer connection to the UE, the base station may determine based on at least one characteristic of the data whether to transmit the data to the UE on the multiple component carriers or rather on just one of the component carriers, and the base station may then schedule and engage in the transmission in accordance with that determination.

As a specific example of this, the base station may decide, based at least on a type of media represented by the data, whether to transmit the data to the UE on the multiple component carriers in the UE's established radio-link-layer connection or rather on just one of the component carriers in the UE's established radio-link-layer connection. For instance, as the base station receives data representing streaming media content for transmission over the radio-link-layer connection to the UE, the base station may determine whether the received data represents non-advertising content or rather represents advertising content, and (i) the base station may transmit on the multiple component carriers any such data that the base station determines represents non-advertising content but (ii) the base station may transmit on just one of the component carriers any such data that the base station determines represents advertising content. Likewise, the base station could dynamically manage whether to transmit on multiple component carriers or rather on just one component carrier based on various other differentiating characteristics of the data to be transmitted as well.

Accordingly, in one respect, disclosed is a method operable by a base station. In accordance with the method, the base station establishes a radio-link-layer connection between the base station and a UE, the radio-link-layer connection encompassing a plurality of component carriers. Further, the base station receives data for transmission over the radio-link-layer connection to the UE, and the base station makes determination, based on at least one characteristic of the received data, whether to transmit the received data to the UE on the plurality of component carriers or rather on just one of the component carriers. The base station then transmits the received data to the UE in accordance with the determination. For instance, if the determination is that the data represents non-advertising content, then the base station may responsively transmit the data to the UE on the plurality of component carriers, but if the determination is that the data represents advertising content, then the base station may responsively transmit the data to the UE on just one of the component carriers.

In another respect, disclosed is a method operable by a base station that has an established radio-link-layer connection with a UE, the radio-link-layer encompassing at least first and second component carriers on which the base station is configured to provide the UE with carrier-aggregation service. In accordance with the method, the base station receives first data for transmission over the radio-link-layer connection to the UE and second data for transmission over the radio-link-layer connection to the UE, the first data representing first media content and the second data representing second media content. Further, the base station determines that the first media content represented by the first data is of a first type and that the second media content represented by the second data is of a second type different than the first type. Based on that determination, the base station then (i) transmits the first data to the UE on both the first and second component carriers concurrently but (ii) transmits the second data to the UE on just the first component carrier and not the second component carrier.

Still further, in another respect, disclosed is a base station that includes an antenna structure for transmitting over a radio-frequency air interface and a controller configured to manage transmission via the antenna structure over the air interface. Per the disclosure, the controller is configured to (i) detect receipt by the base station of data for transmission over the established radio-link-layer connection to a UE with which the base station has an established radio-link-layer connection encompassing first and second component carriers, (ii) determine a type of media content represented by the received data, (iii) based on the determined type of media content represented by the received data, make a decision of whether to transmit the received data to the UE concurrently on the first and second component carriers or rather on just the first component carrier, and (iv) cause the base station to transmit the data to the UE in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
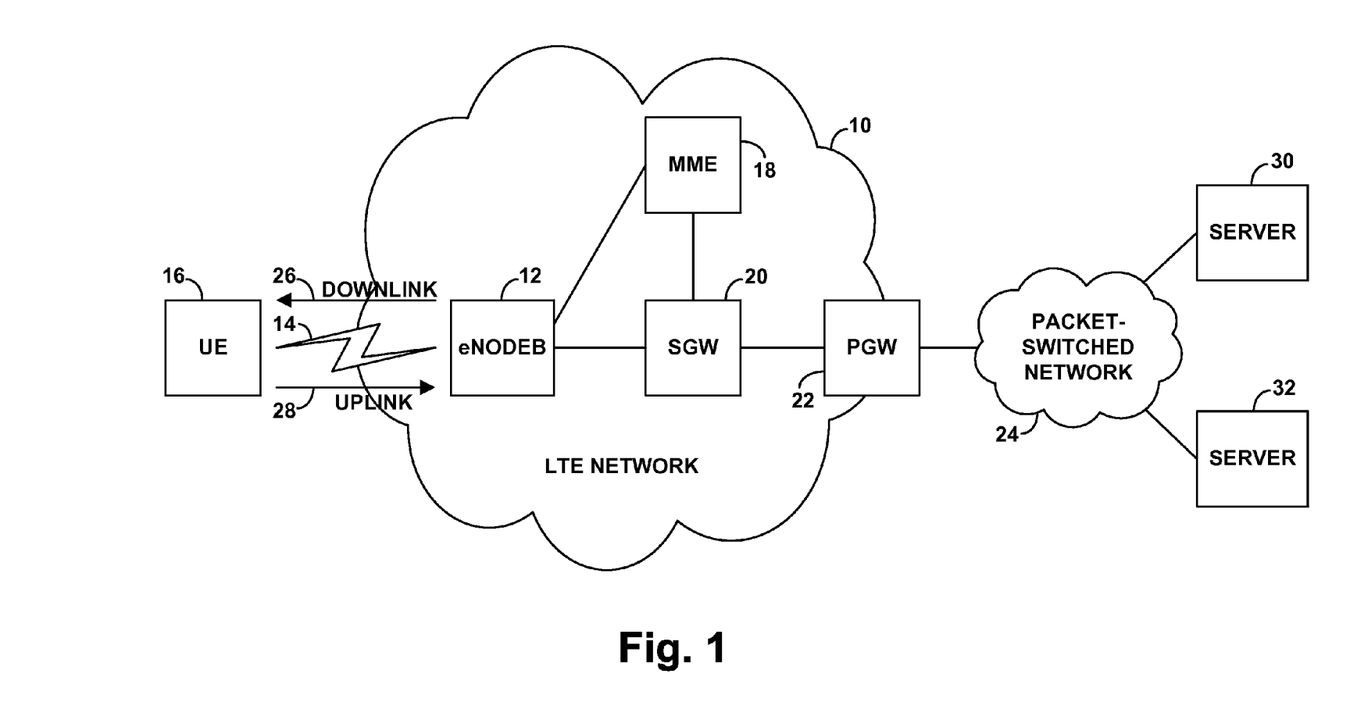
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UE may be configured to support air interface communication on various carriers, which may be frequency-division-duplex (different uplink and downlink frequency channels) or time-division-duplex (the same frequency channel divided over time to carry downlink and uplink communications). Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may engage in an attach process in order to register with the LTE network, and the UE may engage in signaling with the eNodeB to establish a radio-link-layer connection through which the eNodeB may serve the UE. In particular, the UE may initially transmit to the eNodeB an attach request, which the eNodeB may pass along to the MME 18, triggering a process of authenticating the UE and establishment of one or more logical bearer connections for the UE between the eNodeB and the PGW 22. Further, the eNodeB and UE may then engage in radio resource control (RRC) signaling in order to establish for the UE a radio-link-layer connection, i.e., a logical air interface connection through which the eNodeB can then serve the UE with scheduled downlink and uplink communications.

Through RRC signaling at the time of initially establishing the UE's RRC connection and/or later, the eNodeB may specify a set of carriers on which the eNodeB will be providing the UE with carrier-aggregation service within the radio-link-layer connection, and the UE may responsively tune itself to operate on the specified carriers. The set of carriers would thus include at least a first component carrier F1 and a second component carrier F2. Further, the eNodeB could designate one of the carriers as a PCell and each other carrier as an SCell.

Once the UE has such an RRC connection, the eNodeB may then serve the UE in an RRC-connected mode. In that mode, as the eNodeB receives bearer data for the UE (e.g., from network 24 via PGW 22 and SGW 20), the eNodeB may allocate air interface resources within the UE's radio-link-layer connection to carry the data to the UE, and the eNodeB may transmit the data to the UE in accordance with the allocation.

Specifically in the example carrier-aggregation scenario with component carriers F1 and F2, the eNodeB may allocate some resource blocks or other such resources on carrier F1 for carrying a portion of the data and some resource blocks or other such resources on carrier F2 for concurrently carrying another portion (or a duplicate of part or all of the same portion) of the data, and the eNodeB may transmit the data to the UE accordingly. In practice, to accomplish this for transmission in a given sub-frame, the eNodeB may transmit one or more DCIs for the resource allocation on the two carriers—such as a DCI respectively on each carrier for the resource allocation on that carrier, or a DCI on just the PCell for the resource allocation on both carriers—and the eNodeB may transmit the data to the UE in that sub-frame in accordance with resource allocation specified by the DCI(s).

The data that the eNodeB receives for transmission over the UE's radio-link-layer connection may be data that comes from a server or other entity on or via the network 24. FIG. 1 depicts two examples of such entities as servers 30 and 32. These servers may take various forms and serve various purposes, which may differ from each other, and they may thus be configured to delivery various different types of media. For instance, server 30 might be part of an Internet Multimedia Subsystem (IMS), such as a call server that delivers voice over Internet Protocol (VoIP) data to UEs, and server 32 might be a streaming video server that delivers video data to UEs. Alternatively, server 30 might be a streaming video server that delivers video-program content such as movies and television shows, perhaps for a subscription fee, and server 32 might be a streaming video server that delivers advertisements such as commercial messages that advertise or promote products, services, or other media. Other examples are possible as well, such as various types of web servers, multimedia messaging servers, multicast-broadcast servers, end-user devices, and/or other types of data-transmitting entities now known or later developed. In likely practice, each of these entities will have at least one network address on network 24 (or on one or more other networks), such as an IP address, which may be the source address from which the entity provides data for transmission to the UE.

Such an entity may thus transmit data from its source address to a destination address of the UE, and that data may flow over network 24 to the PGW 22, from where the data would then be routed to the SGW 20 and in turn to eNodeB 12 for transmission over the air to the UE. The data may take the form of a sequence of packets, such as IP packets, each having a header segment that specifies the source address and the destination address and a payload segment that carries a portion of the data. As the eNodeB receives these packets, the eNodeB may buffer the packets until the eNodeB has allocated air interface resources for carrying the packets to the UE, and the eNodeB may then transmit to the UE in the allocated air interface resources.

Once the eNodeB has established for the UE radio-link-layer connection that encompasses multiple component carriers (such as F1 and F2), as noted above, the eNodeB may normally transmit data to the UE concurrently on the multiple component carriers. Per the present disclosure, however, the eNodeB will instead make an informed decision of whether to transmit particular received data to the UE concurrently on the multiple component carriers on which the UE is set to receive or rather to transmit the received data to the UE on just one of those component carriers. In particular, the eNodeB may make this decision based on one or more characteristics of the received data, such as what type of media is represented by the received data for example. The eNodeB may thus be configured to decide, based on the type of represented media, to transmit the data on the multiple component carriers concurrently (e.g., distributing the transmission among PDSCH resources on the multiple component carriers concurrently), or to decide, based on the type of represented media, to transmit the data on just one of the component carriers (i.e., sending the data on the PDSCH of just one of the component carriers, such as just on the PCell for instance). This process could be used, for instance, to provide for transmission of non-advertising content on multiple component carriers concurrently but to limit transmission of advertising content to be on just one component carrier at a time.

To facilitate this, the eNodeB may include control logic that evaluates the received data to determine one or more characteristics of the data, such as what type of media it represents, and that causes the eNodeB to transmit accordingly.

Figure 2:
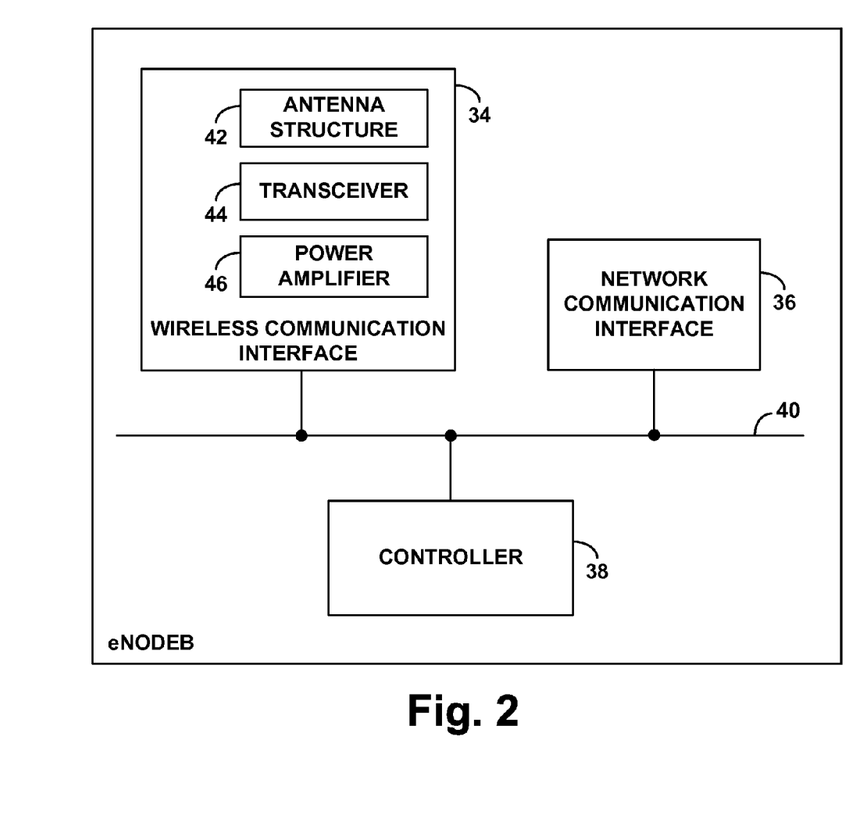
FIG. 2 is a simplified block diagram of an example base station operable in accordance with the disclosure.

FIG. 2 is a simplified block diagram of an example eNodeB (e.g., macro eNodeB, small cell, or other type of base station), showing some of the components that such a device may include in order to carry out these and other operations. As shown, the example eNodeB includes a wireless communication interface 34, a network communication interface 36, and a controller 38, all of which could be integrated together in various ways or, as shown, interconnected with each other through a system bus, network, or other connection mechanism 40.

Wireless communication interface 34 includes an antenna structure (e.g., one or more antennas or antenna elements) 42, which could be tower mounted or provided in some other manner, configured to transmit and receive over the air interface and thereby facilitate communication with served UEs. Further, the wireless communication interface includes a transceiver 44 and power amplifier 46 supporting air interface communication according to the LTE protocol. Network communication interface 36 may then comprise one or more wired and/or wireless network interfaces (such as an Ethernet interface) through which the base station may receive data over a backhaul connection from SGW 20 as discussed above.

Controller 38, which may be integrated with wireless communication interface 34 or with one or more other components of the eNodeB, may then be configured to manage communication over the air interface, including managing transmission of received data to a served UE one or multiple component carriers in the UE's radio-link-layer connection (e.g., LTE connection) in accordance with the present disclosure. By way of example, controller 38 may be configured to (i) detect receipt by the base station of data for transmission over the air interface to a UE with which the eNodeB has an established radio-link-layer connection encompassing first and second component carriers, (e.g., by monitoring incoming packet data and thereby determining that the incoming data is destined to such a UE), (ii) determine one or more characteristics of the received data (e.g., implicitly or expressly determining a type of media content represented by the data), (iii) based on the determined characteristic(s), making a decision of whether to transmit the data to the UE concurrently on the first and second component carriers (i.e., on multiple component carriers) or rather on just the first component carrier (i.e., on just one component carrier), and (iv) causing the eNodeB to transmit the data to the UE in accordance with the decision (e.g., controlling the wireless communication interface 34 accordingly).

Controller 38 could be implemented using hardware, software, and/or firmware. For example, controller 38 could include one or more processors and a non-transitory computer readable medium (e.g., volatile and/or non-volatile memory) that stores machine language instructions or other executable instructions. The instructions, when executed by the one or more processors, may cause controller 38, and thus the eNodeB, to carry out the various base station operations described herein.

Figure 3:
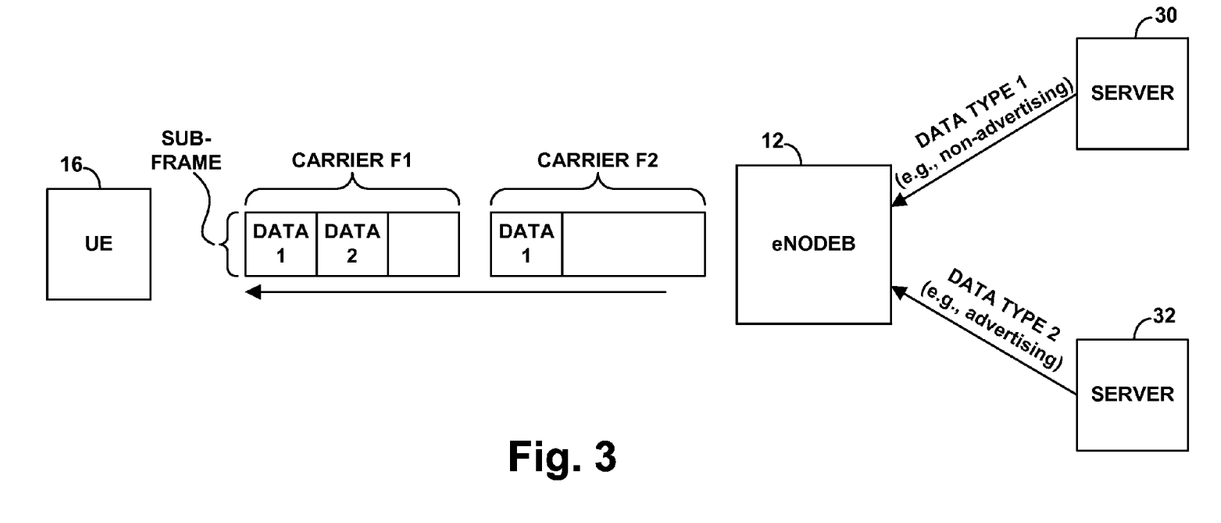
FIG. 3 is a diagram depicting how the present management of transmission on component carriers can work in practice.

FIG. 3 is next a diagram to help illustrate how the present method can work in practice. In particular, FIG. 3 depicts eNodeB 12 in communication with servers 30 and 32 and in communication with UE 16, with eNodeB 12 receiving data from the two servers and transmitting the data to the UE. In the example arrangement shown, the data coming from server 30 has one or more particular characteristics (such as representing non-advertising content), and the data coming from server 32 has one or more other characteristics (such as representing advertising content). For each such received data, the eNodeB then decides based at least in part on its one or more characteristics whether to transmit the data to the UE on the multiple component carriers concurrently or rather on just one component carrier.

In the example shown, the decision is that the data ("data type 1") coming from server 30 should be transmitted on the multiple component carriers concurrently, at least in part because the data has one or more particular characteristics, such as representing non-advertising content for instance. Thus, that data from server 30 is shown being transmitted over the air interface to the UE concurrently on carriers F1 and F2. Whereas, the decision is that the data ("data type 2") coming from server 32 should be transmitted on just one component carrier, at least in part because the data has one or more other particular characteristics, such as representing advertising content for instance. Thus, that data from server 32 is shown being transmitted over the air interface to the UE on just one of the carriers.

In practice, as in this example, the differential handling of these two types of received data could be within a particular sub-frame, so that, within that sub-frame, the eNodeB both transmits one type of received data on the multiple component carriers concurrently but transmits the other type of received data on just one of the component carriers. Alternatively, the decision and handling of a given type of data could be made without regard to the decision and handling of another type of data, but still based on the one or more characteristics of the data (e.g., based on the type of media content that it represents).

The eNodeB can determine the one or more characteristics of received data in various ways so as to decide how to manage transmission of the data to the UE. As one example, the eNodeB could evaluate the header of a received packet, which may include within it some implicit or express indication of one or more characteristics of the data. For instance, it may be the case that one type of data (e.g., data representing one type of media content, such as non-advertising content) generally comes from one particular source address (e.g., from a server that is set to provide that type of data), and that another type of data (e.g., data representing another type of media content, such as advertising content) generally comes from another particular source address (e.g., from a server that is set to provide that other type of data), and the eNodeB could be programmed with correlation data that maps source address with type of data, or directly with an indication of whether to transmit on multiple component carriers concurrently or rather on just one component carrier. In that case, the eNodeB may thus read the source address from a received packet and, based on the correlation data, make the decision of how to manage transmission of the packet to the UE.

As another example, the eNodeB could engage in deep-packet inspection, by which the eNodeB reads the payload of a received packet and, through analysis of that data, determines a relevant characteristic, such as what type of media the data represents, and the eNodeB may manage the transmission accordingly. And as still another example, the eNodeB may determine the one or more characteristics of the received data based on one or more characteristics of a bearer over which the eNodeB receives the data, and the eNodeB may likewise manage the transmission accordingly. Other examples are possible as well.

Figure 4:
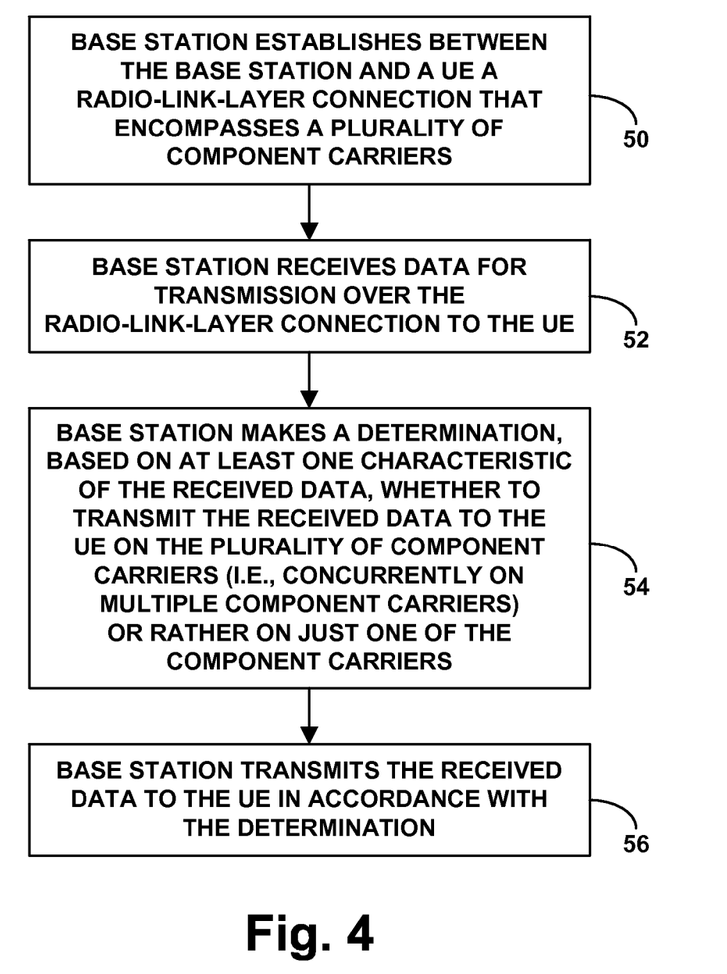
FIG. 4 is a flow chart depicting example operations in accordance with the disclosure.

FIG. 4 is next a flow chart depicting example operations that a base station such as eNodeB 12 could carry out in accordance with the discussion above. As shown in FIG. 4, at block 50, the base station establishes between the base station and a UE a radio-link-layer connection that encompasses a plurality of component carriers. For instance, the base station may engage in RRC configuration signaling with the UE as discussed above, specifying the component carriers, so that the base station would be set to allocate resources on those carriers for communication with the UE and the UE would be set to receive scheduling directives for and engage in communication on those carriers. At block 52 (which could occur before block 50, if the UE is in an RRC idle mode for instance), the base station then receives data for transmission over the radio-link-layer connection to the UE. For instance, the base station may receive data from one or more servers such as those discussed above.

At block 54, the base station then makes a determination, based on at least one characteristic of the received data, whether to transmit the received data to the UE on the plurality of component carriers (i.e., concurrently on multiple component carriers) or rather on just one of the component carriers. For instance, the base station may make this determination based on a type of media represented by the data as discussed above. And at block 56, the base station transmits the received data to the UE in accordance with the determination. Thus, if the determination is to transmit the data to the UE on the plurality of component carriers, then the base station would do that. But if the determination is instead to transmit the data to the UE on just one of the component carriers, then the base station would do that instead.

In line with the discussion above, in this process, the at least one characteristic of the received data may comprise a type of media content represented by the received data, making the determination based on the at least one characteristic may involve (i) if the type is a first type rather than a second type, then determining to transmit the received data to the UE on the plurality of component carriers; but (ii) if the type is a second type rather than the first type, then determining to transmit the received data to the UE on just one of the component carriers. Further, the first type may be non-advertising content (e.g., content that is not primarily an advertisement of a product, service, or the like), and the second type may be advertising content (e.g., content that is primarily an advertisement of a product, service, or the like).

Also in line with the discussion above, the received data could be packet data that includes a packet header indicating the type of the media content represented by the data (e.g., by a source address that corresponds with the type, such as a first source address corresponding with the first type rather than the second type, or a second source address corresponding with the second type rather than the first type), in which case the act of making the determination based on at least the type of the media content represented by the received data could involve reading the packet header to determine the type and making the determination based on the determined type.

Figure 5:
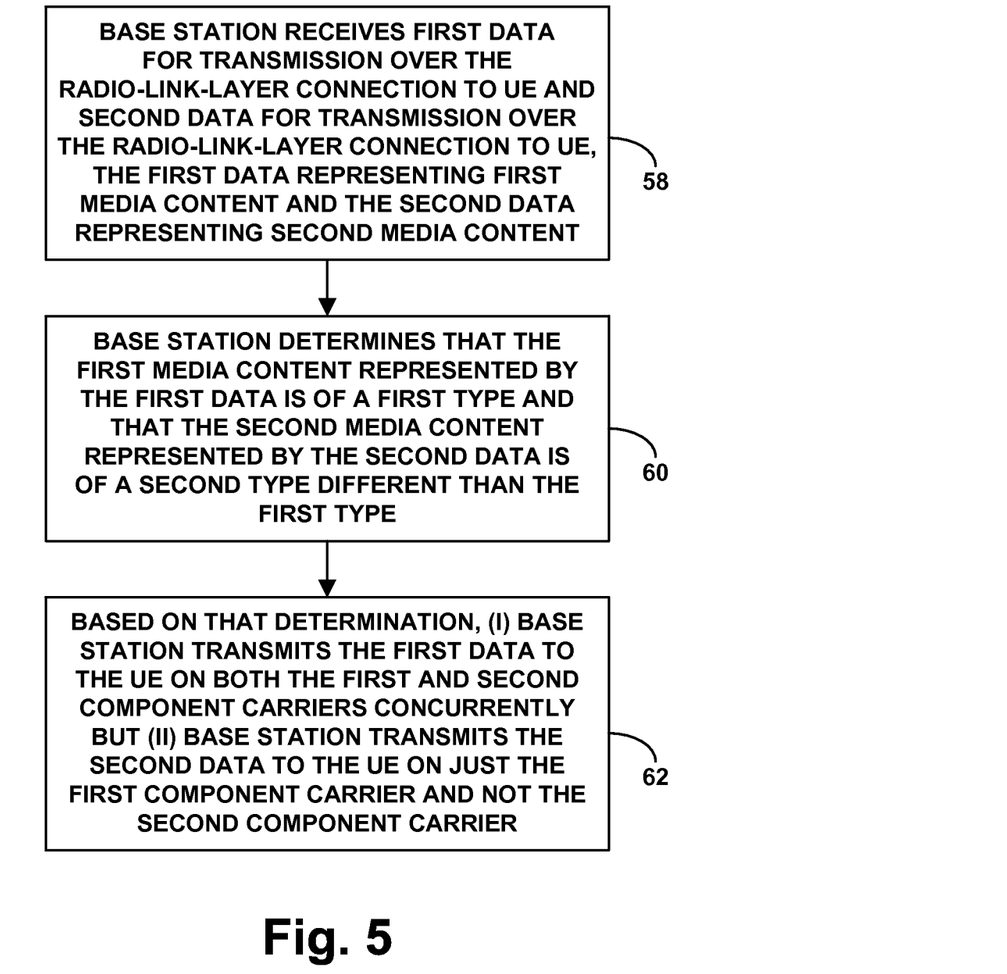
FIG. 5 is another flow chart depicting example operations in accordance with the disclosure.

Finally, FIG. 5 is another flow chart depicting functions that can be carried out in accordance with the discussion above, in a base station having an established radio-link-layer connection with a UE, where the radio-link-layer connection encompasses at least first and second component carriers on which the base station is configured to provide the UE with carrier-aggregation service.

As shown in FIG. 5, at block 58, the base station receives first data for transmission over the radio-link-layer connection to the UE and second data for transmission over the radio-link-layer connection to the UE, the first data representing first media content and the second data representing second media content. At block 60, the base station then determines that the first media content represented by the first data is of a first type and that the second media content represented by the second data is of a second type different than the first type. And at block 62, based on that determination, (i) the base station transmits the first data to the UE on both the first and second component carriers concurrently but (ii) the base station transmits the second data to the UE on just the first component carrier and not the second component carrier.

Various features described above can be applied in the context of this method as well. For instance, the first and second types of media content could be non-advertising content and advertising content respectively, the determination of media types could be made based on source addresses of the data, the carriers could be LTE carriers, the act of transmitting first data to the UE on both component carriers concurrently may involve transmitting a portion of the first data on sub-carriers within the first component carrier and another portion of the first data on sub-carriers within the second component carrier, and the act of transmitting the second data to the UE on just the first component carrier may involve transmitting an entirety of the first data on sub-carriers within the first component carrier.

Exemplary embodiments have been described above. Those skilled in the art will understand, however, that changes and modifications may be made to these embodiments without departing from the true scope and spirit of the invention.

What is claimed is:

1. A method comprising:
  establishing by a base station a radio-link-layer connection between the base station and a user equipment device (UE), the radio-link-layer connection encompassing a plurality of component carriers;
  receiving by the base station data for transmission over the radio-link-layer connection to the UE;
  making a determination by the base station, based on at least one characteristic of the received data, whether to transmit the received data to the UE on the plurality of component carriers encompassed by the radio-link-layer connection or rather on just one of the plurality of component carriers encompassed by the radio-link-layer connection; and
  while the radio-link-layer connection encompasses the plurality of component carriers, transmitting by the base station the received data to the UE in accordance with the determination,
  wherein transmitting the received data to the UE in accordance with the determination comprises (i) transmitting to the UE at least one downlink control information (DCI) message specifying downlink resources that will carry the received data to the UE and (ii) transmitting the received data in the specified downlink resources to the UE,
  wherein if the determination is to transmit the received data on the plurality of component carriers, then the downlink resources include downlink resources on more than one of the plurality of component carriers, whereas if the determination is to transmit the received data on just one of the component carriers, then the downlink resources are on just that one component carrier.

2. The method of claim 1, wherein the at least one characteristic comprises a type of media content represented by the received data, and wherein making the determination based on the at least one characteristic comprises:
  if the type is a first type rather than a second type, then determining to transmit the received data to the UE on the plurality of component carriers; but
  if the type is a second type rather than the first type, then determining to transmit the received data to the UE on just one of the component carriers.

3. The method of claim 2, wherein the first type is non-advertising content and the second type is advertising content.

4. The method of claim 2, wherein the received data is packet data including a packet header that indicates the type of the media content represented by the data, and wherein making the determination based on at least the type of the media content represented by the received data comprises:
  reading the packet header to determine the type; and
  making the determination based on the determined type.

5. The method of claim 4, wherein the packet header indicates the type by including a source address that corresponds with the type, wherein a first source address corresponds with the first type rather than the second type, and wherein a second source address corresponds with the second type rather than the first type, and
  wherein reading the packet header to determine the type comprises reading the packet header to determine the source address, and correlating the determined source address with the type.

6. The method of claim 1, wherein the radio-link-layer connection is a Long Term Evolution (LTE) connection.

7. The method of claim 6, wherein establishing the radio-link-layer connection between the base station and the UE comprises engaging in Radio Resource Control (RRC) signaling with the UE to establish the radio-link-layer connection, wherein the RRC signaling specifies the plurality of component carriers.

8. The method of claim 1, wherein the plurality of component carriers includes a primary component carrier and a secondary component carrier,
  wherein (i) if the determination is to transmit the received data to the UE on the plurality of component carriers, then the base station transmits the data to the UE distributed on both the primary component carrier and secondary component carrier, but (ii) if the determination is to transit the received data to the UE on just one of the component carriers, then the base station transmits the data to the UE on just the primary carrier and not on the secondary component carrier.

9. In a base station having an established radio-link-layer connection with a user equipment device (UE), wherein the radio-link-layer connection encompasses at least first and second component carriers on which the base station is configured to provide the UE with carrier-aggregation service, a method comprising:
  receiving into the base station first data for transmission over the radio-link-layer connection to the UE and second data for transmission over the radio-link-layer connection to the UE, wherein the first data represents first media content and the second data represents second media content;
  determining by the base station that the first media content represented by the first data is of a first type and that the second media content represented by the second data is of a second type different than the first type; and based on the determining, (i) transmitting by the base station the first data to the UE on both the first and second component carriers concurrently but (ii) transmitting by the base station the second data to the UE on just the first component carrier and not the second component carrier, wherein the base station transmits to the UE at least one downlink control information (DCI) message specifying first downlink resources on the first and second component carriers for carrying the first data and specifying second downlink resources on the first component carrier for carrying the second data, and the base station transmits the first data on the specified first downlink resources and transmits the second data on the specified second downlink resources.

10. The method of claim 9, wherein the first media content is non-advertising content, and wherein the second media content is advertising content, whereby the base station transmits the non-advertising content on both the first and second component carries concurrently but transmits the advertising content on just the first component carrier and not the second component carrier.

11. The method of claim 10, wherein determining by the base station that the first media content represented by the first data is of a first type is based on a first source address of the first data, and wherein determining by the base station that the second media content represented by the second data is of a second type is based on a second source address of the second data.

12. The method of claim 9, wherein the component carriers are Long Term Evolution (LTE) carriers.

13. The method of claim 9, wherein transmitting the first data to the UE on both the first and second component carriers concurrently comprises transmitting a portion of the first data on sub-carriers within the first component carrier and another portion of the first data on sub-carriers within the second component carrier, and wherein transmitting the second data to the UE on just the first component carrier comprises transmitting an entirety of the first data on sub-carriers within the first component carrier.

14. A base station comprising:

an antenna structure for transmitting over a radio-frequency air interface; and a controller configured to manage transmission via the antenna structure over the air interface, wherein the controller is configured to (i) detect receipt by the base station of data for transmission over an established radio-link-layer connection to a user equipment device (UE) with which the base station has an established radio-link-layer connection encompassing first and second component carriers, (ii) determine a type of media content represented by the received data, (iii) based on the determined type of media content represented by the received data, make a decision of whether to transmit the received data to the UE concurrently on the first and second component carriers or rather on just the first component carrier, and (iv) while the radio-link-layer connection encompasses the first and second component carriers, cause the base station to transmit the data to the UE in accordance with the decision, wherein causing the base station to transmit the data to the UE in accordance with the decision comprises: (a) if the decision is to transmit the received data to the UE on both the first and second component carriers, then causing the base station to (i) transmit to the UE one or more downlink control information messages that specify resources on both the first and second component carriers and (ii) transmit the received data to the UE on the specified resources on the first and second component carriers, and (b) if the decision is to transmit the received data to the UE on just the first component carrier, then causing the base station to (i) transmit to the UE a downlink control information message that specifies resources on just the first component carrier and (ii) transmit the received data to the UE on the specified resources on the just the first component carrier.

15. The base station of claim 14, wherein the controller is configured to determine whether the media content is non-advertising media content or rather advertising media content, wherein the decision is to transmit the received data to the UE concurrently on the first and second component carriers if the controller determines that the type is non-advertising content but (ii) the decision is to transmit the received data to the UE on just the first component carrier if the controller determines that the type is advertising content.

16. The base station of claim 14, wherein the component carriers are Long Term Evolution (LTE) component carriers.

17. The base station of claim 14, wherein the received data comprises packet data having a particular source address, and wherein the controller is configured to determine based on the source address the type of the media content represented by the received data.

* * * * *